Patented Apr. 6, 1943

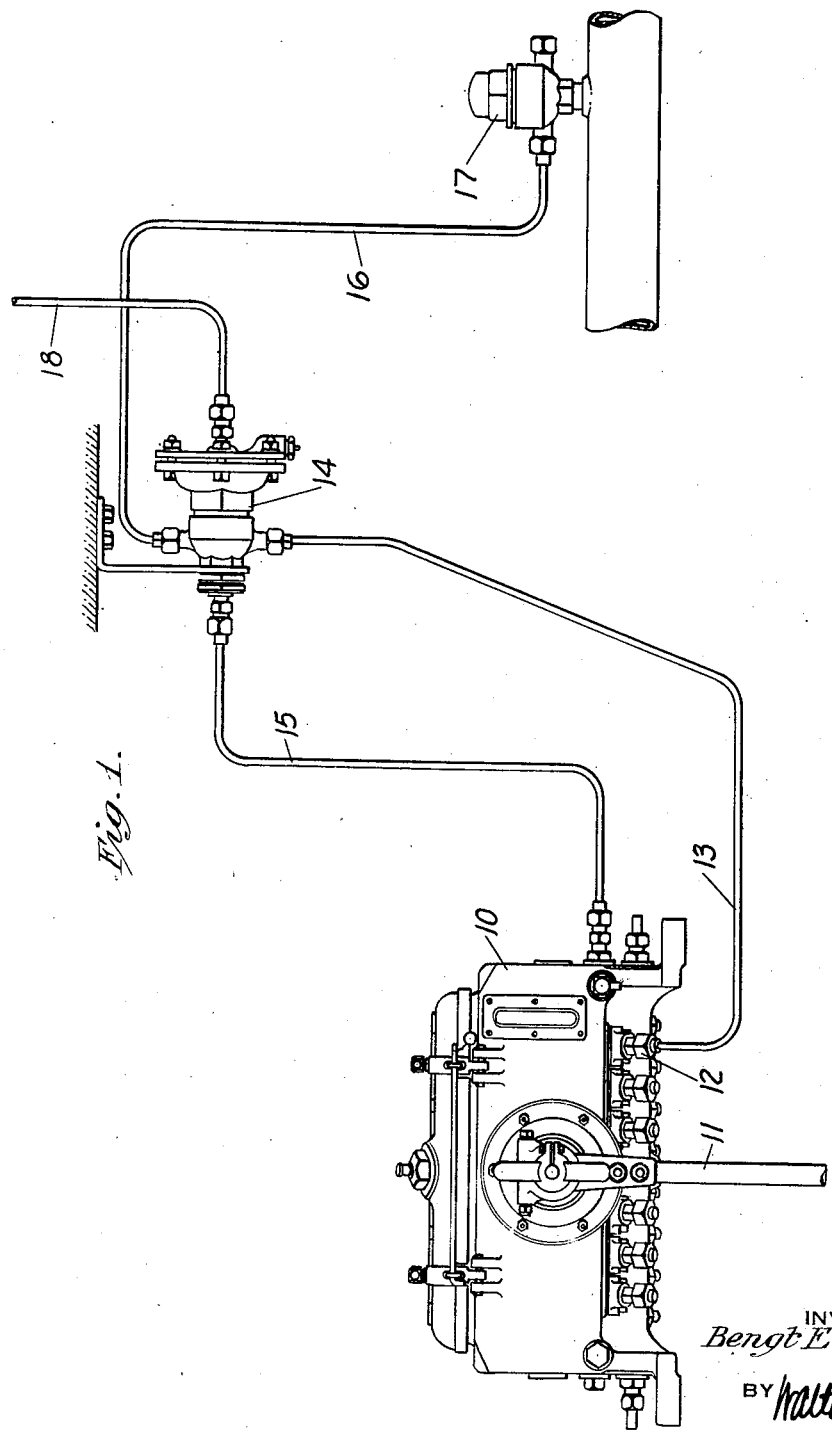

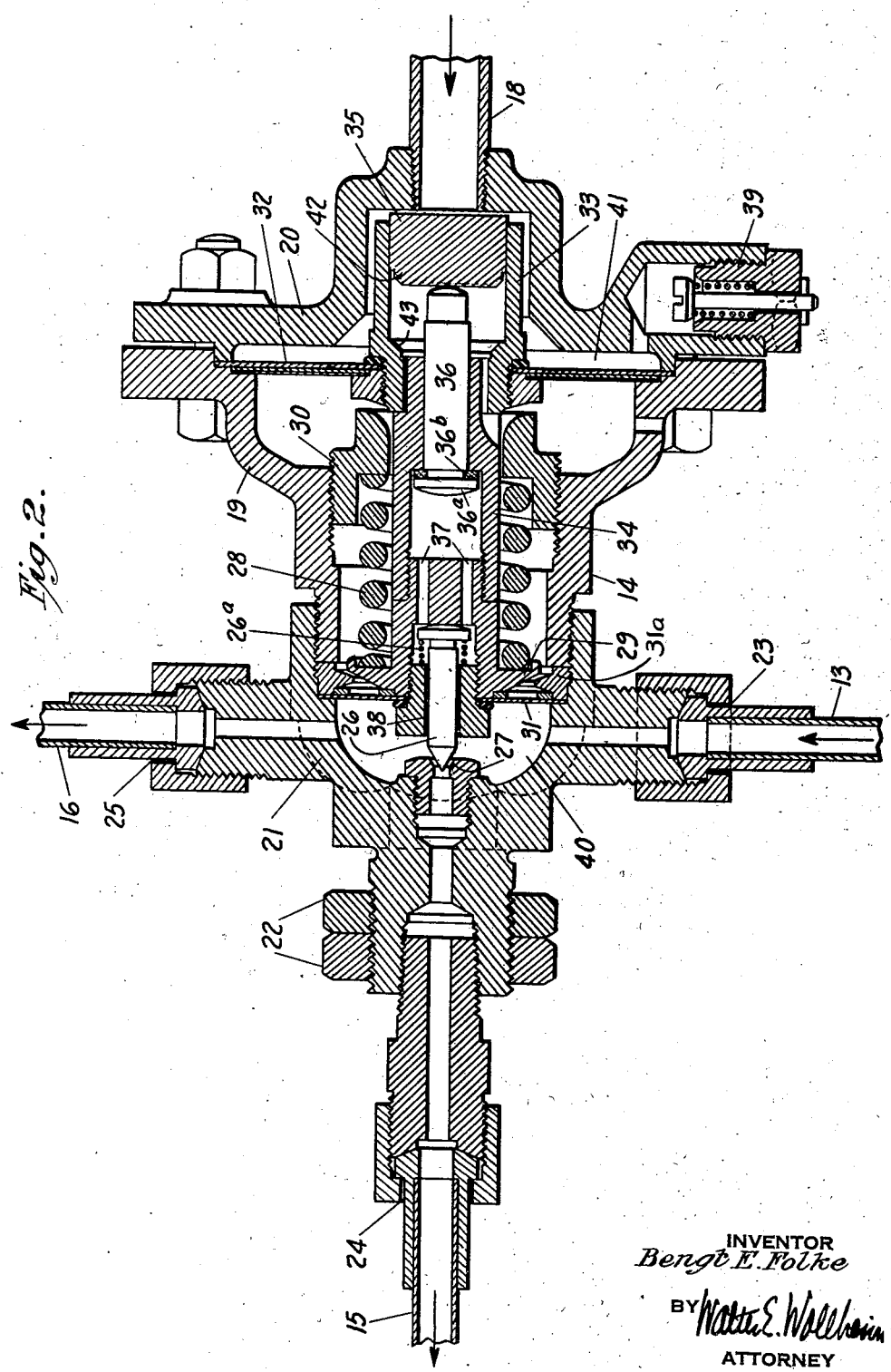

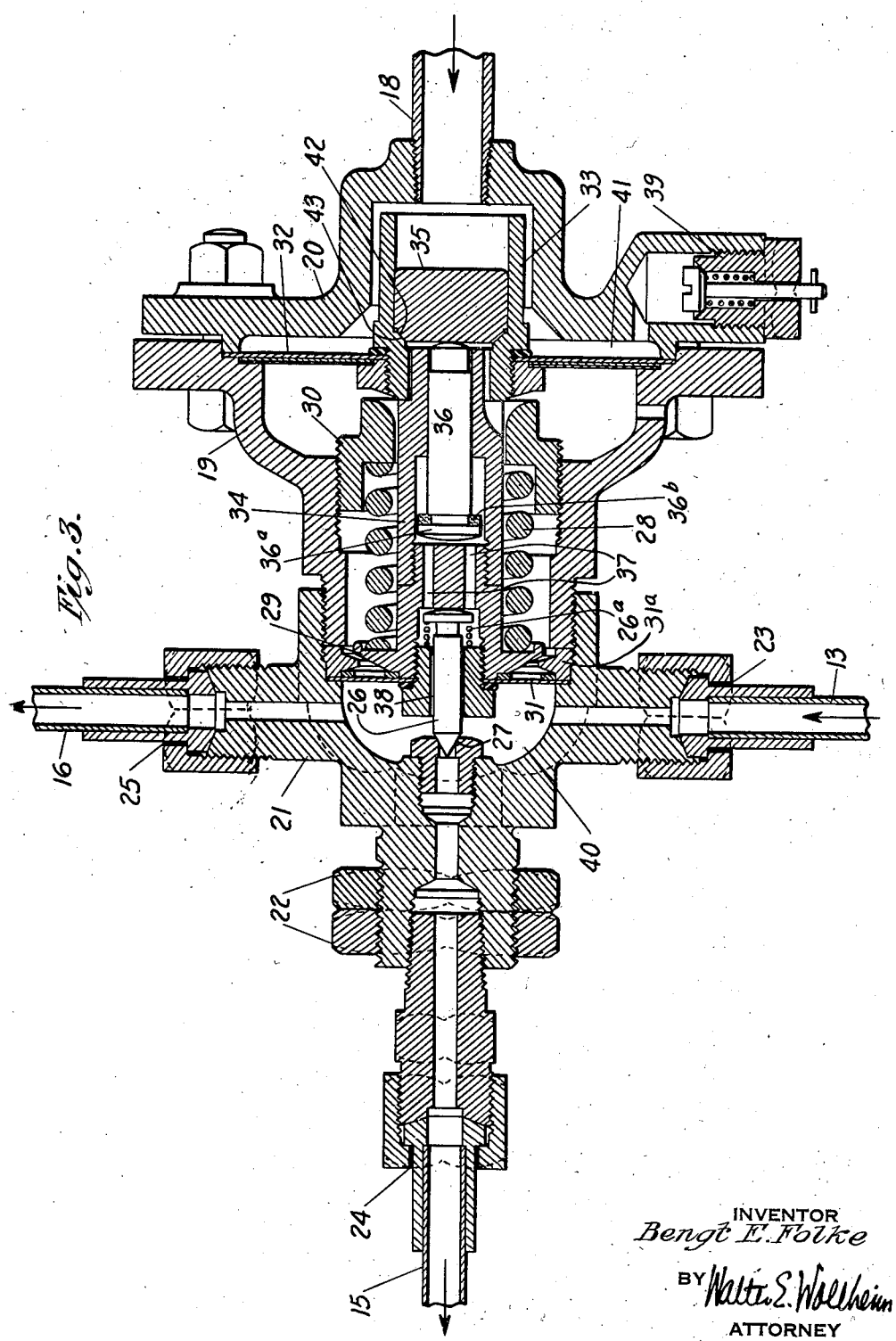

2,315,778

UNITED STATES PATENT OFFICE 2,315,778

LUBRICATING SYSTEM

Bengt E. Folke, Mamaroneck, N. Y., assignor to Nathan Manufacturing Company, New York, N. Y., a corporation of New York Application July 31, 1941, Serial No. 404,757

13 Claims. (Cl. 184—7)

It is one of the principal objects of the invention to provide means whereby oil fed from a source of supply under pressure, such as a mechanical lubricator for instance, may at times be injected for lubricating purposes into a device which is ordinarily not lubricated by such a source of supply, these means diverting the oil to its source at all other times.

Another object is to provide means whereby a certain amount of oil from a principal source of supply may be delivered to a location where a lubricant is required at such times when no oil is being discharged from its principal source.

The invention is particularly applicable to the lubrication of booster or auxiliary engines on steam locomotives in which, by virtue of the control means forming the objects of this invention, oil from a feed of a mechanical lubricator, ordinarily supplying oil to the principal parts of the main engine and other wearing surfaces of the locomotive, can be injected automatically into a steam pipe leading to the auxiliary engine when the same is started by its customary air throttle, while at all other times these control means return the oil to the lubricator.

In the drawings in which a preferred embodiment of the invention is shown.

Fig. 1 illustrates a general view of an installation of the control means in connection with a mechanical lubricator, Fig. 2 shows a longitudinal section through the control means proper in a position in which oil is being returned to the lubricator, and Fig. 3 shows a similar sectional view in a position in which no oil is being returned to the lubricator but immediately after injection of oil into a device to be lubricated.

Like characters of reference denote similar parts throughout the several views and the following specification.

Referring to Fig. 1, 10 shows a mechanical lubricator operated by means of a drive lever 11, connected to some suitable moving member (not shown) for the purpose of operating the lubricator. Lubricant is supplied through a pumping unit 12 and a pipe line 13 to an oil control valve 14. A pipe line 15 serves as a return of the lubricant from the oil control valve 14 to the lubricator 10. Pipe 16 serves to supply lubricant to a terminal check 17 of a spring compressed type, well known in the art, located conveniently near the part to be lubricated.

Pipe 18 supplies fluid pressure for the operation of the oil control valve 14.

As shown in Figs. 2 and 3, the control valve 14 consists of an upper casing 19, a cover 20 and a body part 21. Suitable clamping nuts 22 are provided at its end for supporting purposes. The body 21 has an inlet connection 23, a return connection 24 and a discharge connection 25.

26 is a valve member adapted to act against a valve seat 27, but shown in Fig. 2 spaced therefrom in an open position. Valve 26 is adapted to be held against its seat by means of a regulating spring 28 exerting pressure on the valve through an abutment 29. 26a is a spring underneath the head of valve 26 for the purpose of holding valve 26 against abutment 29. The tension of spring 28 may be adjusted by means of a regulating nut 30. 31 is a flexible diaphragm which serves to support and actuate valve 26. 31a is a threaded member adapted to clamp diaphragm 31 against a shoulder in body 21.

A diaphragm 32 is located in casing 19 and held in place by cover 20. Diaphragm 32 supports a cylinder member 33 which rests against a tubular extension 34 of abutment 29. Extension 34 has fitted into it an oil plunger 36 having an enlarged head 36a and a soft gasket 36b immediately adjacent to it. Plunger 36 is operated by an air piston 35 slidingly fitted into cylinder 33. Passages 37 and clearance space 38 around valve 26 permit oil to be pumped by plunger 36 into an oil chamber 40. A suitable automatic drain valve is provided at 39 to drain whatever condensation may accumulate in a space 41 above diaphragm 32.

The operation of the oil control means is as follows:

Oil is delivered from the lubricator 10 through pumping unit 12 and pipe 13 into the control valve 14 through inlet connection 23. The oil fills chamber 40 and is forced through connection 25 into pipe 16 to terminal check 17. The tension of regulating spring 28 is adjusted by means of regulating nut 30 to permit the oil pressure on diaphragm 31 to lift valve 26 from its seat at a pressure lower than that required to open terminal check 17. The oil discharged around valve 26 through outlet connection 24 is returned to the lubricator by means of pipe 15. The oil control valve in this position is shown in Fig. 2.

When the device to be lubricated is placed in operation, fluid pressure is admitted through pipe 18 to one side of the large control valve diaphragm 32 into space 41. The fluid pressure simultaneously acts upon piston 35. The pressure on top of diaphragm 32 transmitted through members 34 and 29, in addition to the pressure exerted by spring 28, holds valve 26 firmly upon its seat. The pressure upon piston 35 forces the same to contact with oil plunger 36. Head 36a and that part of the plunger 36 which extends into the cavity in the center of extension 34 act as a displacement member and force the oil through restricted passages 37 and 38 into oil chamber 40. The restricted passages 37 and 38 offer a resistance to the flow of oil therethrough resulting in a slow movement of oil plunger 36 and actuating piston 35. This assures full pressure on top of the large diaphragm 32 and positive closing of valve 26, while piston 35 and plunger 36 complete their travel. The movement of piston 35 is limited by contact between its edge 42 against a seat 43 in cylinder 33. The closing of valve 26 prevents return of oil through connection 24 and, by action of oil plunger 36, the pressure in oil lines 13 and 16 and oil chamber 40 is raised sufficiently to open terminal check 17 and inject oil through this check into the device to be lubricated. Additional oil injected from the lubricator through pipe 13 passes through pipe 16 and terminal check 17, as long as pressure remains on diaphragm 32. This position is shown in Fig. 3.

By relieving the pressure in pipe 18 on top of diaphragm 32 the pressure which holds valve 26 against seat 27, will be reduced, and the excess pressure in oil chamber 40 acting on diaphragm 31 then lifts valve 26 from its seat and permits the oil again to be returned through connection 24 and pipe 15 to the lubricator. When the oil pressure in chamber 40 becomes less than that required to open terminal check 17, valve 26 again is urged toward seat 27, not entirely closing the opening therein but restricting it, and thus preventing the pressure in conduits 13 and 16 from being entirely dissipated. As mentioned before, the tension of regulating spring 28 is adjusted to permit the oil pressure on diaphragm 31 to lift valve 26 from its seat 27 at a pressure lower than that required to open terminal check 17. It is important that the oil in conduits 13 and 16 be kept at as high a pressure at all times as possible to reduce to a minimum the amount of oil and the time required again to build up the pressure sufficiently to open the terminal check 17 when the device to be lubricated is placed in operation. As oil is admitted from the lubricator 10 into conduit 13 and cavity 40, the oil pressure unseats valve 26 momentarily to permit the return of oil to the lubricator, but this pressure is insufficient to open valve 17. If no additional oil is injected from the lubricator through pipe 13, valve 26 finally comes to rest against seat 27 as the pressure in chamber 40 drops to a predetermined value. As the fluid pressure has been relieved on top of piston 35, the pressure of the oil in chamber 40 acting on oil plunger 36 through the restricted passages 37 and 38 gradually forces the oil plunger back into the original position shown in Fig. 2.

It will, of course, be understood that the fluid pressure in pipe 18 may be controlled manually by means of a suitable valve in this pipe, or may be controlled automatically by the working fluid of the parts to be lubricated in a manner well known in the art.

When intended to lubricate a booster engine on a locomotive, pipe 18 is connected to the air pipe below the air operating valve of the booster engine, so that air will be admitted into pipe 18 immediately upon opening of the throttle. This admits air into oil control valve 14, closes small valve 26 therein, thus stopping the return of oil to the main lubricator, and by pressure upon the piston 35 transmitted to plunger 36 oil is forced through restricted passages 37 and 38 into pipe 16 and, by way of the terminal check 17, into the steam pipe of the booster engine.

When the engine is not running and the lubricator also is inoperative, it is obvious that, upon admission of air into the oil control valve in the manner just mentioned, oil from the central cavity of stem 34 will be forced slowly through conduit 16 and terminal check 17 to the part to be lubricated. Because the conduits 13 and 16 are filled with oil as already explained, but under a pressure slightly less than that of terminal check 17, lubrication or discharge of oil through terminal check 17 will be effected practically immediately and for a certain length of time determined by the resistance of the restricted outlets 37 of the oil cavity to the oil displaced therein by head 36a and that portion of the plunger 36 which extends into the cavity.

While I have shown a preferred embodiment of the invention in the drawings and described the same herein, it is obvious that it is susceptible to many structural changes. So for instance, in place of diaphragms, I may avail myself of pistons under the doctrine of mechanical equivalents.

Many other modifications may, of course, be made in the instrumentalities disclosed without departing from the principles of the invention, as defined in the appended claims.

What I claim as new, is:

1. In a lubricating system, an oil control valve having a chamber with an inlet for oil under pressure, an outlet, and a by-pass, and a fluid pressure connection, a pressure control valve in communication with said outlet, a stop valve within said chamber normally restricting and adapted to close said by-pass, means in said oil control valve for closing said stop valve, and other means for increasing the pressure in said oil control valve to discharge oil from said chamber through its outlet against said pressure control valve for lubricating purposes, both means being actuated by fluid pressure through said connection.

2. In a lubricating system, an oil control valve having a chamber with an inlet for oil under pressure, an outlet, and a by-pass, and a fluid pressure connection, a pressure control valve in communication with said outlet, a stop valve within said chamber normally restricting and adapted to close said by-pass, a diaphragm cooperating with said stop valve for closing said stop valve, and piston means for increasing the pressure in said chamber after closing of said stop valve, to discharge oil from said chamber through its outlet against said pressure control valve for lubricating purposes, said diaphragm and piston means being actuated by fluid pressure through said connection.

3. In a lubricating system, an oil control valve having a chamber with an inlet for oil under pressure, an outlet, and a by-pass, and a fluid pressure connection, a pressure control valve in communication with said outlet, a stop valve within said chamber adapted to close said by-pass, a supporting stem for said stop valve, means in said oil control valve for closing said stop valve, and other means within said stem for increasing the pressure in said chamber after closing of said stop valve to discharge oil from said chamber through its outlet against said pressure control valve for lubricating purposes, both means being actuated by fluid pressure through said connection.

4. In a lubricating system, an oil control valve having a chamber with an inlet for oil under pressure, an outlet, and a by-pass, and a fluid pressure connection, a pressure control valve in communication with said outlet, a stop valve within said chamber adapted to close said by-pass, a supporting stem for said stop valve, an adjustable spring for said stop valve mounted upon said stem, means in said oil control valve for closing said stop valve, and other means within said stem for increasing the pressure in said chamber after closing of said stop valve to discharge oil from said chamber through its outlet against said pressure control valve for lubricating purposes, both means being actuated by fluid pressure through said connection.

5. In a lubricating system, an oil control valve having a chamber with an inlet for oil under pressure, an outlet, and a by-pass, a pressure control valve in communication with said outlet, a stop valve within said oil control valve adapted to close said by-pass, a support for said stop valve having an oil cavity and restricted ducts in communication with said chamber, said oil control valve having a fluid pressure connection, means operable by fluid pressure through said connection adapted to close said stop valve and to force oil from said cavity and through said restricted ducts into said chamber to discharge oil from said chamber through its outlet against said pressure control valve for lubricating purposes.

6. In a lubricating system, an oil control valve having a chamber with an inlet for oil under pressure, an outlet, and a by-pass, a pressure control valve in communication with said outlet, a stop valve within said oil control valve adapted to close said by-pass, a support for said stop valve having an oil cavity and restricted ducts in communication with said chamber, said oil control valve having a fluid pressure connection, means for closing said stop valve, and other means for forcing oil from said cavity and through said restricted ducts into said chamber to discharge oil from said chamber through its outlet against said pressure control valve for lubricating purposes, both means being actuated by fluid pressure through said connection.

7. In a lubricating system, an oil control valve having a chamber with an inlet for oil under pressure, an outlet, and a by-pass, a pressure control valve in communication with said outlet, a stop valve within said oil control valve adapted to close said by-pass, a support for said stop valve having an oil cavity and restricted ducts in communication with said chamber, said oil control valve having a fluid pressure connection, a diaphragm cooperating with said support for closing said stop valve, and piston means for forcing oil from said cavity and through said restricted ducts into said chamber after closing of said stop valve to discharge oil from said chamber through its outlet against said pressure control valve for lubricating purposes, said diaphragm and piston means being actuated by fluid pressure through said connection.

8. In a lubricating system, an oil control valve having a chamber with an inlet for oil under pressure, an outlet, and a by-pass, a pressure control valve in communication with said outlet, a stop valve adapted to close said by-pass, a support for said stop valve, said support having an oil cavity and restricted ducts in communication with said chamber, said oil control valve having a fluid pressure connection, means actuated by fluid pressure through said connection and cooperating with said support adapted to close said stop valve, a piston and a plunger slidably engaging said support, said piston by fluid pressure through said connection adapted to force said plunger to enter said cavity and force oil therefrom and through said restricted ducts into said chamber after closing of said stop valve to discharge oil from said chamber through its outlet against said pressure control valve for lubricating purposes.

9. In a lubricating system, an oil control valve having a chamber with an inlet for oil under pressure, an outlet, and a by-pass, a pressure control valve in communication with said outlet, a stop valve within said oil control valve adapted to close said by-pass, a support for said stop valve, said support having an oil cavity and restricted ducts in communication with said chamber, said oil control valve having a fluid pressure connection, a diaphragm supported at outside walls of said oil control valve, a cylinder fastened to said diaphragm and abutting said support, a piston slidably engaging said cylinder, a plunger slidably disposed within said support and extending into said cavity, said diaphragm actuated by fluid pressure through said connection and cooperating with said support adapted to close said stop valve, and said piston by fluid pressure through the same connection adapted to force said plunger to enter said cavity and force oil therefrom and through said restricted ducts into said chamber after closing of said stop valve to discharge oil from said chamber through its outlet against said pressure control valve for lubricating purposes.

10. In a lubricating system, an oil control valve having a chamber with an inlet for oil under pressure, an outlet, and a by-pass, a pressure control valve in communication with said outlet, a stop valve within said oil control valve adapted to close said by-pass, a support for said stop valve, a relatively small flexible diaphragm between said support and outer walls of said oil control valve operatively connected with said stop valve and forming one of the walls of said chamber, said support having an oil cavity and restricted ducts in communication with said chamber, said oil control valve having a fluid pressure connection, a relatively large flexible diaphragm supported at outside walls of said oil control valve, a cylinder fastened to said large diaphragm and abutting said support, a piston slidably engaging said cylinder, and a plunger slidably disposed within said support and extending into said cavity, said large diaphragm actuated by fluid pressure through said connection and cooperating with said support adapted to close said stop valve, and said piston by fluid pressure through the same connection adapted to force said plunger to enter said cavity and force oil therefrom and through said restricted ducts into said chamber after closing of said stop valve to discharge oil from said chamber through its outlet against said pressure control valve for lubricating purposes.

11. In a lubricating system, an oil control valve having an inlet for oil under pressure, an outlet, a by-pass, and a fluid pressure connection, a pressure control valve in communication with said outlet, a stop valve within said oil control valve, means cooperating with said stop valve to normally restrict said by-pass and continually urge said stop valve toward its seat, and other means in said oil control valve, actuated by fluid pressure through said connection, for closing said stop valve and increasing the pressure in said oil control valve to discharge oil from said outlet against said pressure control valve for lubricating purposes.

12. In a lubricating system, an oil control valve having a chamber with an inlet for oil under pressure, an outlet, and a by-pass, a fluid pressure connection to said valve, a pressure control valve in communication with said outlet, a stop valve within said chamber, adjustable means cooperating with said stop valve to normally restrict said by-pass and continually urge said stop valve toward its seat, and other means in said oil control valve, actuated by fluid pressure through said connection, for closing said stop valve and increasing the pressure in said chamber to discharge oil from said chamber through its outlet against said pressure control valve for lubricating purposes.

13. In a lubricating system, a force feed lubricator having a reservoir and a discharge connection for oil under pressure, a pressure control valve in direct communication with a point to be lubricated, and an oil control valve interposed between said lubricator and pressure control valve, said oil control valve having an inlet communicating with the discharge connection from said lubricator, an outlet communicating with said pressure control valve, a by-pass connecting with the reservoir of said lubricator, a valve for said by-pass, means to normally restrict said by-pass and continually urge the valve for said by-pass toward its seat, other means actuated by the pressure in said control valve to open said by-pass, a fluid pressure connection, and means actuated by fluid pressure from said connection for the purpose of closing said by-pass and building up oil pressure within said oil control valve after such closing to discharge oil therefrom through its outlet against said pressure control valve for lubricating purposes.

BENGT E. FOLKE.